Aug. 6, 1935.  E. W. SMITH  2,010,498
ENVELOPE SEPARATOR
Filed July 25, 1932
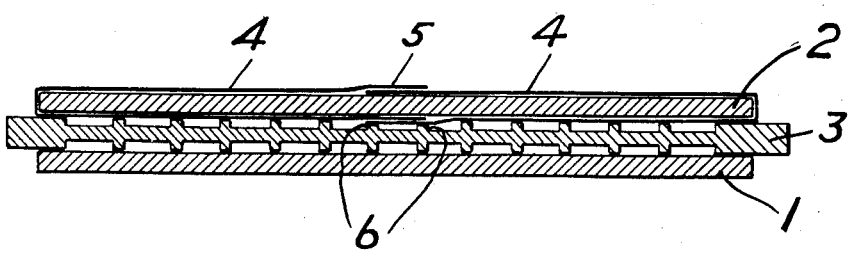
INVENTOR
Edward W. Smith
BY
Augustus B. Stoughton
ATTORNEY.

Patented Aug. 6, 1935

2,010,498

UNITED STATES PATENT OFFICE 2,010,498

ENVELOPE SEPARATOR

Edward W. Smith, Philadelphia, Pa., assignor to The Electric Storage Battery Company, Philadelphia, Pa., a corporation of New Jersey Application July 25, 1932, Serial No. 624,468

2 Claims. (Cl. 136—147)

It is found advantageous in certain designs of storage battery to use between adjacent positive and negative plates a grooved wood separator and in addition to employ between the positive plate and this wood separator a sheet of perforated or slotted hard rubber. This latter serves to protect the wood against the oxidizing action of the active material of the positive plate and also to retain this active material. In the case of very thin plates, it has been found advantageous to wrap the sheet of perforated rubber around the vertical edges of the positive plate in order to avoid the possibility of short circuits due to the collection of moss which otherwise bridges between the positive and negative plates around the wood separator. In some cases these so called envelope rubber separators are formed in two parts, enclosing the positive plate on both vertical edges and meeting in the center. As heretofore used, the vertical edges of these so called envelopes are made to approach each other closely but from practical considerations, they may not be made to touch and hence there is always an open gap from the top to the bottom of the envelope. This gap is of varying width, often increased by the unsupported edges of the rubber separators bending away from the plate surface. It has been found in practice that this gap permits the active material of the positive plate to loosen and fall to the bottom of the cell to such an extent as seriously to limit the life of the battery. To avoid this, the present invention provides for lapping the edges of the rubber envelopes, thus eliminating the gap and affording means for retaining the active material at this point as effectively as on other parts of the plate.

Where the lap takes place there is necessarily a double thickness of rubber, and in order to permit the whole group to be assembled with suitable tightness, the ribs of the grooved wood separators which engage with the lapped rubber are reduced in thickness so as to keep the combined thickness of the wood and rubber substantially uniform throughout as shown in Figure 1.

For a further exposition of my invention reference may be had to the annexed drawing and specification at the end whereof my invention will be specifically pointed out and claimed.

The accompanying drawing illustrates this construction in horizontal section. The modification of my device chosen for illustration in the drawing consists of the negative plate 1, the positive plate 2, the double grooved wood separator 3, and the perforated rubber sheet envelopes 4, which are shown to overlap at 5. The two middle ribs of the wood separator 6 are reduced in height to allow for the increased thickness where the rubber sheets overlap.

I do not intend to be limited in the practice of my invention save as the scope of the prior art and of the attached claims may require.

I claim:

1. A plate group for a storage battery including a positive plate, a negative plate, a separator between said plates having a portion of reduced thickness extending the entire height of said separator, and perforated rubber envelopes surrounding said positive plate laterally and having an overlap opposite the portion of reduced thickness of said separator said overlap being intermediate and spaced from the side edges of said positive plate.

2. A plate group for a storage battery comprising in combination a positive plate, a negative plate, a separator between said plates having a portion of reduced thickness extending the entire height of said separator, and a perforated rubber envelope surrounding said positive plate laterally and having an overlap opposite and partially enclosed by the portion of reduced thickness of said separator, said overlap being intermediate and spaced from the side edges of said positive plate.

EDWARD W. SMITH.